June 10, 1941.   J. A. R. GOODE   2,245,270

GRIP-AND-RELEASE DEVICE

Filed Feb. 12, 1941

INVENTOR
J. A. R. GOODE
By Wachauhter & Groff Attys.

Patented June 10, 1941

2,245,270

UNITED STATES PATENT OFFICE 2,245,270

GRIP-AND-RELEASE DEVICE

John Alfred Richard Goode, Romford, England

Application February 12, 1941, Serial No. 378,688
In Great Britain June 1, 1939

6 Claims. (Cl. 294—83)

This invention relates to a grip-and-release device for securely holding various articles, such as for example retractable undercarriages of aircraft, bombs and packages carried by aircraft, depth charges and mines carried by sea-going vessels or any other article, and also suitable for other purposes, such as locks for gates, releasable socket mountings for machine-guns, hinge-pins and the like.

It is obviously desirable that such devices be of a foolproof character, i. e. that they shall firmly and positively grip the article when caused to engage same and definitely release the article when their releasing means are operated. Various known grip-and-release devices are erratic in operation and often fail to grip or release the article, with undesirable and sometimes fatal consequences.

The present invention is an improvement on that type of grip-and-release device having a pair of relatively movable claws disposed side by side and spaced apart, between which is mounted a slide element for opening the claws by cam action when said slide is moved in one direction, and has for its primary object not only to open the claws by cam action but also positively to close the same by cam action without recourse to springs for this purpose as proposed in previous devices of this type. A device according to the invention is proof against loosening of parts by shaking or vibration and will not fail to act either to grip or to release the article when operated for the purpose.

According to the invention, a grip-and-release device of the type set forth has a pair of claws, one or each of which is formed on a lever pivoted so that the claws are relatively movable for opening and closing together, and the pivoted or each pivoted claw lever has a pair of projections on its inner edge, one on each side of the pivot, to coact with a sliding element adapted to work longitudinally between the levers, operating means being provided on the device for moving said slide element at least in a direction to engage one of the claw lever projections for pressing the claws open, movement of the slide in the other direction (brought about by any suitable method) causing it to engage the other claw lever projection for positively closing the claws.

In order that the invention may be more readily understood reference is directed to the following description and accompanying drawing wherein.

Figure 1:
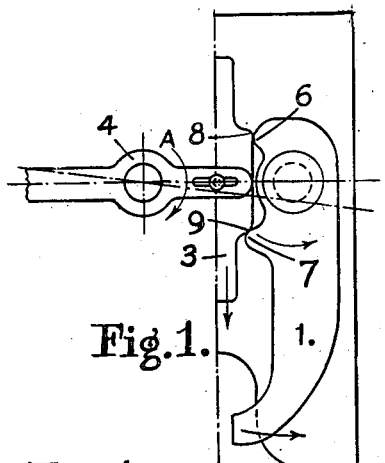
Figures 1 to 3 are diagrams described later.

Referring firstly to the diagrams (Figures 1-3), these show only one pivoted lever with its claw, but it is to be understood that there is a second claw on the left-hand side of the vertical centre which would usually be symmetrical and similarly operated (as for example in the embodiment according to Figures 4-6); in this case both claws move in unison to produce the aforesaid relative movement therebetween. One claw however may be fixed (as for example in the embodiment according to Figure 7) and in such a case the to-and-fro movement of one claw with respect to the fixed claw produces the necessary relative movement.

In the three diagrams the lever 1 is swung about its pivot 2 by axial movement of the slide element 3, i. e. longitudinal movement between the claws. The slide element 3 may be operated in any suitable manner as by the central lever 4 or by the abutting end of an upper lever 5.

As will be seen in Figure 1 the slide element 3 is an integral member with no relatively movable parts, and when the lever 4 is moved in the direction of the arrow A the other parts are caused to move in the direction of the appropriate arrows. This is brought about by the interaction of the cam projections 6 and 7 on the inner edge of the lever 1 with the shoulders 8 and 9 on the slidable element 3. In this design the shoulder 8 would be just dropping past the cam 6 as the shoulder 9 is pushing away the cam 7. Theoretically the contacting surfaces can be so designed that the shoulder 6 moves inwards to permit the shoulder 7 simultaneously to move outwards for opening the claw, but in practice it is found best to allow for a slight lag between the respective inter-operations of 6—8 and 7—9, otherwise the movable members are continually poised on critical points, and vibration may cause inadvertent actuation unless recourse is had to complications in design. In a device operating according to the invention both opening and closing of the claws are effected by moving the sliding element 3 through the lever 4.

Figure 2:
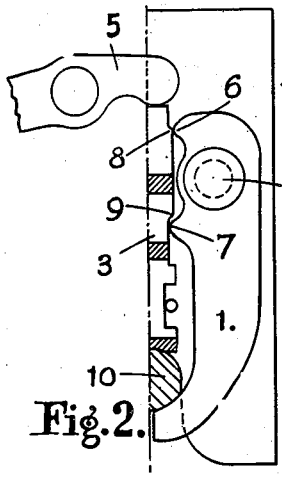
Figure 3:
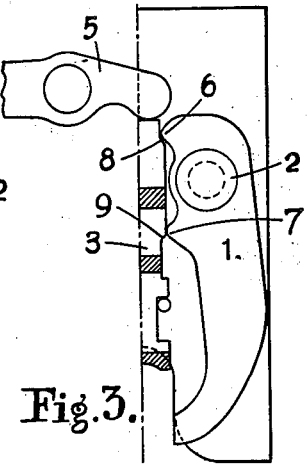

In Figures 2 and 3, the shaded areas on the sliding element represent alternative locations for elastically compressible parts, such as compression springs or soft rubber blocks. By locating such a compressible part between the two cams 6 and 7, downward pressure on the slide 3 will first move the top of the slide downwards in relation to the bottom (assumed to be hard up against some resistance, as for instance against the locked element 10) and thereby free the cam 6 from the shoulder 8. Continued pressure then moves the slide en bloc and the shoulder 7 is pressed out (see Figure 3), the claw end of the lever of course moving out with the shoulder 7 to free the element 10 so that the slide 3 can move bodily. Thus, the cam 6 need not be critically poised on the shoulder 8 as illustrated but can be given a degree of play away from the corner. This, in fact, is the principle employed in the constructions described later. If the compressible part is located below the shoulder 9 as in either of the two other cases depicted, the same effect and advantage is obtained, but a slight play between shoulder 9 and cam 7 is certainly wanted to ensure a lag in their inter-operation whilst cam 6 is being cleared.

Figure 4:
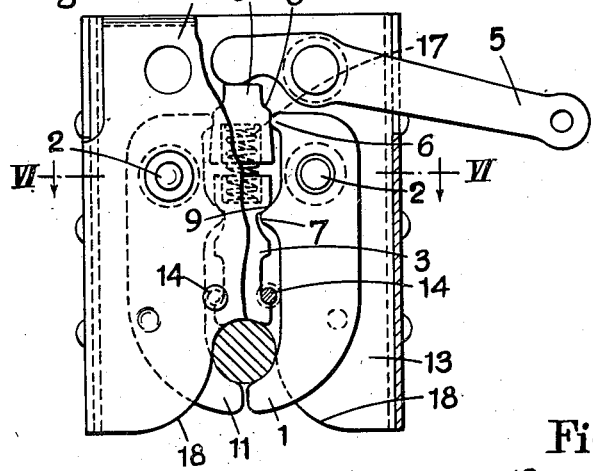
Figure 4 is a face view of a device constructed according to the invention.
Figure 5:
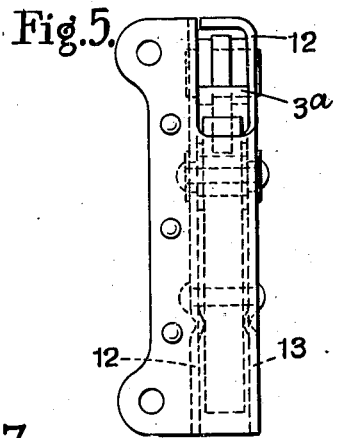
Figure 5 is a side elevation looking from the left of Figure 4.
Figure 6:
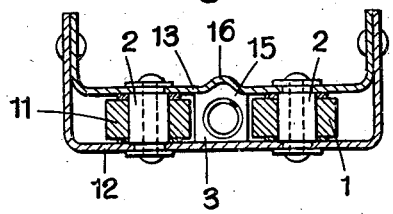
Figure 6 is a transverse section on line VI—VI of Figure 4.

Figures 4-6 show a construction based upon the diagrams Figures 2-3 where a compressible part is inserted at the upper part of the slide element 3.

In this embodiment the two claw levers 1 and 11 are pivotally mounted near one of their ends at points 2 between two plates 12 and 13 which are suitably fixed together with the interposition of spacing pieces. Disposed centrally between the levers there is a longitudinally movable slide element, the stroke of which is limited in both directions by pins 14 extending between the plates and engaging in recesses in the opposite edges of the slide element. The slide element is in two parts: a lower and longer part 3 and an upper and shorter part 3a. The parts are guided co-axially for example by means of a rib 15 (see Figure 6) running in the groove 16. A compression spring 17 is disposed between the two parts, the ends of the spring conveniently lodging in recesses formed in the opposite end faces of the parts. The plates between which the claw levers are mounted are recessed in V-shape at 18 to leave the claw or gripping ends of the levers 1 and 11 free. Each lever has two cam projections 6 and 7 on its inner edge, one on each side of the pivot 2 thereof, said cam projections cooperating with respective shoulders 8 and 9 on the upper and lower parts 3a and 3 of the slide element. The portion of the upper part of the slide element 3a above the shoulders 8 is narrower than the portion under the shoulders and the portion of the lower part 3 of the slide below the shoulders 9 is narrower than the portion above the shoulders. When the wider portion of the upper part 3a of the slide engages the adjacent cam projections 6 of the levers it spreads the arms of the levers on the far side of their pivots (relatively to their gripping ends) apart, so that the gripping ends are caused to close tightly as in Figure 4. In this position the cam projections 7 of the levers on the other side of the pivots engage under the shoulders 9 of the lower part of the slide element and a load, such as the loop 10 of an article (e. g. a bomb) rests on the inner surface of the closed gripping ends of the levers. In the particular embodiment herein described the lower part of the slide element is extended so as to engage snugly and saddle on the upper side of the load (loop 10) gripped by the claws.

A two-armed operating lever 5 is pivoted between the aforesaid plates and one end thereof engages the outer end of the upper part 3a of the slide element and is prevented from swinging outwards in any suitable manner. The other end of the operating lever may carry a handle or may be formed with a hole for the attachment of a cable or some other means whereby the lever may be actuated.

When the operating lever is actuated the upper part 3a of the slide element is first moved axially relatively to the lower part 3 of the slide element against the action of the compression spring 17 disposed between the two parts, with the result that the shoulders 8 of said upper part are moved out of contact with the corresponding cam projections 6 of the levers, thus releasing same for movement towards one another. Following this the upper part 3a of the slide element engages the lower part 3 thereof and the two parts are moved together by the operating lever, with the result that the shoulders 9 on the lower part of the slide element act upon the adjacent cam projections 7 of the levers and spread same apart, opening the claws. The load or article is now free to drop, but it will be appreciated from the foregoing description that in addition to releasing the article is also subject to a positive action of ejection, because the slide element, which engages the top part of the article moves in the direction of ejection, and the spring 17 also provides an ejecting action. The arrangement is such that after the load has been ejected the wider portion of the lower part of the slide element remains between the adjacent cam projections 7 of the claw levers and prevents same from closing. The claws will not close until an article is again inserted between them and the slide element 3, 3a is pushed inwards by the article so as to cause the appropriate cam projections 7 to engage under the shoulders 9 of the lower part of the slide element, the upper part 3a thereof then moving upwards under the action of the said spring 17 and acting upon the appropriate cam projections 6 of the levers, spreading said projections apart and closing the claws with the load engaged therebetween.

It will be seen that the gripping action is positive and takes place under the influence of the load, and that in the particular embodiment described the release action is also positive, the load or article being not only released and allowed to drop under gravity, but is also positively ejected.

Figure 7:
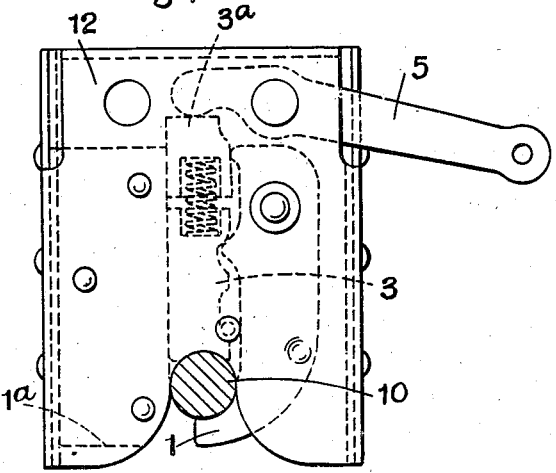
Figure 7 is a view similar to Figure 4 but of an embodiment wherein one movable and one fixed claw are used.

In Figure 7 is seen a modification of the device shown in Figures 4-6 wherein the left-hand claw 11a is not part of a pivoted lever but is fixed, and the relative movement between the two claws is brought about simply by moving the right-hand claw 1.

I claim:

1. A grip-and-release device of the type set forth having a pair of claws one at least of which is formed on a lever pivoted so that the claws are relatively movable for opening and closing, the pivoted claw lever or levers having a pair of projections on the inner edge thereof one on each side of the pivot, to coact with a sliding element adapted to work longitudinally between the levers, operating means on the device for moving said slide element in a direction to engage one of the claw lever projections for pressing the claws open, movement of the slide in the other direction causing it to engage the other claw lever projection for positively closing the claws.

2. A grip-and-release device according to claim 1 and having a pair of claws attached to a pair of pivoted members with the slide element mounted to reciprocate axially therebetween, each claw having a pair of projections on its inner edge one each side of the pivot and the sliding element having a pair of shoulders or equivalents on each side to coact with the adjacent projections of the claws, whereby movement of the sliding element moves the claws about their respective pivots by pressing out one projection of said claw and allowing the other to move inwards.

3. A grip-and-release device according to claim 1 in which the operating means for moving the slide element is a lever adapted to press on top of the said slide element to move it in a direction opening the jaws.

4. A grip-and-release device according to claim 1 wherein the sliding element extends between the claws a distance sufficient to abut against the element held locked between the claws, said sliding element having a compressible insert to enable the shouldered part of the sliding element to be moved towards the locked element for opening the claws.

5. A grip-and-release device according to claim 1 wherein the movement of the sliding element in a return direction for closing the claws is brought about by pressing the sliding element from the end abutting the locked element.

6. A grip-and-release device according to claim 1 wherein the sliding element is in two co-axial parts suitably mounted on the structure supporting the claws to move on a common axis, a compression spring inserted between the two parts, and the division between the parts being located between the two projections of a claw.

JOHN ALFRED RICHARD GOODE.